Jan. 13, 1925. 1,522,614
T. S. COLE
CONSTRUCTION AND MOUNTING FOR PLATES FOR STORAGE BATTERIES AND THE LIKE
Filed March 11, 1922
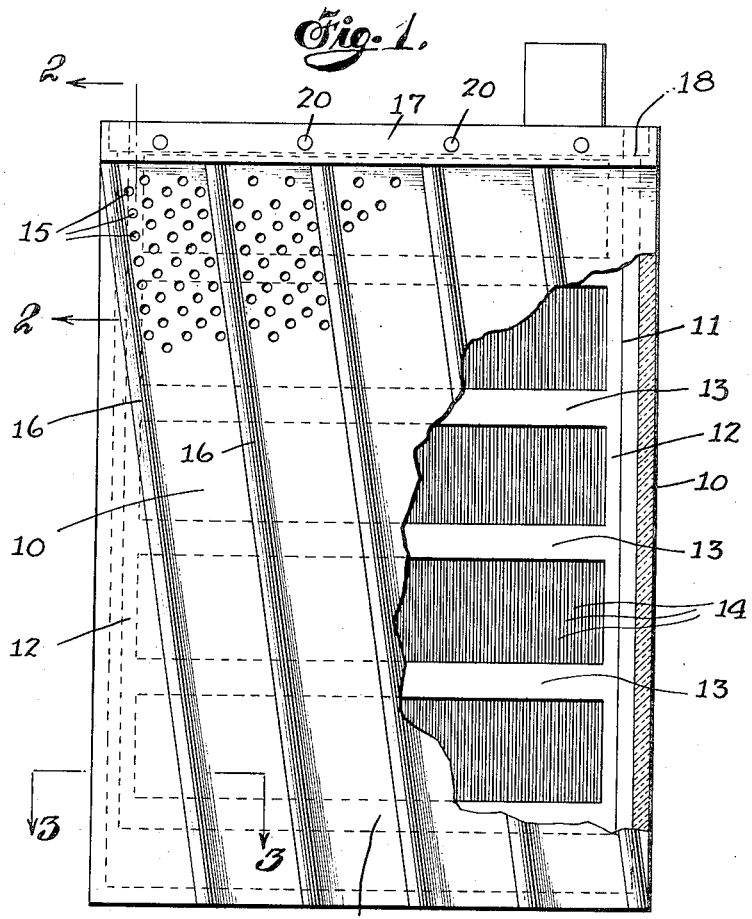
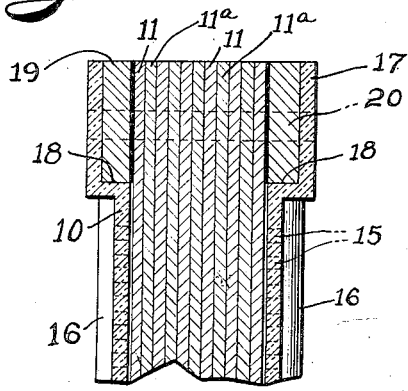
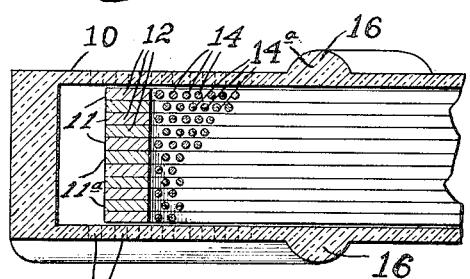
Theodore S. Cole Inventor
By his Attorneys
Emery, Varney, Blair & Hoguet Patented Jan. 13, 1925.

1,522,614

UNITED STATES PATENT OFFICE.

THEODORE S. COLE, OF NEW HAVEN, CONNECTICUT, ASSIGNOR TO SAFETY CAR HEATING & LIGHTING COMPANY, A CORPORATION OF NEW JERSEY.

CONSTRUCTION AND MOUNTING FOR PLATES FOR STORAGE BATTERIES AND THE LIKE.

Application filed March 11, 1922. Serial No. 542,831.

*To all whom it may concern:*

Be it known that I, THEODORE S. COLE, a citizen of the United States, and a resident of New Haven, in the county of New Haven and State of Connecticut, have invented an Improvement in Constructions and Mountings for Plates for Storage Batteries and the like, of which the following is a specification.

This invention relates to the construction of storage or secondary batteries and more particularly to the construction of plates for such batteries.

An object of this invention is to provide a simple and practical plate construction of reliable and efficient action. Another object is to provide a plate construction of the above nature adapted to meet the conditions of hard usage and characterized particularly by long life. Another object is to provide a plate construction of the above nature in which the active material of the plate is so related to the base metal thereof that peeling, blistering or shedding of the material and other detrimental effects tending to separate the active material from the base metal are avoided. Another object of the invention is to provide a practical and rugged means for mounting the elements of a plate to form a single unit adapted for insertion in the cell of a secondary battery. Other objects will be in part obvious or in part pointed out hereinafter.

The invention accordingly consists in the features of construction, arrangement of parts and combination of elements as will be exemplified in the structure to be hereinafter described and the scope of the application of which will be indicated in the following claims.

In the accompanying drawings in which is shown a possible embodiment of this invention, Figure 1 is a front elevation of a complete battery plate unit, certain parts being broken away to show the construction more clearly; and Figure 2 is a sectional view in part taken on the line 2—2 of Fig. 1 showing certain features of construction of the battery plate unit; and Figure 3 is a sectional view in part taken on the line 3—3 of Fig. 1.

Similar reference characters refer to similar parts throughout the several views of the drawings.

As conducive to a clearer understanding of this invention, it might at this point be noted that of the many requirements which a storage battery plate must meet for satisfactory operation, high efficiency of action and length of life, perhaps the most important requirement is that the grid or base metal construction with which the active material is associated be constructed, and the active material associated with it, so that the shedding or peeling off of the active material from the base metal be avoided. It should further be noted at this point that this invention deals particularly with battery plates of the formed or Planté type. In the case of either the Planté type or the pasted type, the active material expands on discharge and contracts on charge of the battery and unless the active material and the base metal are so related that during the expansion and contraction the maximum allowable shearing forces or stresses occurring therebetween are not exceeded, the active material will readily be cracked or peeled off. Furthermore, in the case of Planté type plates, the expansion during formation is very great and to meet such a case also proper provision must be made for relating the active material to the base metal so that the maximum allowable shearing stresses are not exceeded, thus also to prevent the shedding of the active material during the forming process.

By way of clearer explanation as well as understanding of certain features of this invention, it may be pointed out that the active material on the positive plate is chiefly lead peroxide ($PbO_2$), it being understood that the negative Planté type of plate may, for example, be made from the formed positive. As is well-known, lead peroxide has a density considerably less than that of lead; hence, where the plate is formed from the base lead, the peroxide formed thereon must expand or tend to expand in all three directions. During such expansion the stresses occurring between the surfaces of juncture between the base lead and the peroxide must be maintained within a maximum allowable limit in order to prevent these stresses, which appear as shearing forces, from causing a separation of the peroxide from the base lead to take place. The magnitudes of these shearing forces are difficult of determination but may be arrived at empirically. For example, it may be determined by experiment that a strip of lead ½" wide and 0.028" thick will expand approximately 3% linearly when subjected to the Planté process of formation of peroxide upon its surfaces to a depth of 0.003" on each side of the strip, this elongation or expansion taking place in about 60 hours.

Furthermore, experiments may be resorted to, to determine the time-rate of elongation of the lead itself when subjected to tension; thus, for example, a lead strip will increase in length at the rate of 0.025% per hour per 1,000 lbs. of force applied per square inch of cross section. In the case of the first mentioned strip undergoing formation, the elongation of 3% in 60 hours during the forming, gives for the time-rate of expansion or of flow per hour the figure equivalent to $\frac{1}{60}$ of 3%, or 0.050%. This latter figure is thus seen to be twice as great as in the case of the second mentioned lead strip subjected to a force of 1,000 lbs. per square inch of cross section. Therefore, the stress per square inch of cross section in the case of the formed strip must be approximately 2,000 lbs., which figure is about equivalent to the tensile strength of lead. Thus, if the strip of lead is formed to a depth of 0.003" on each side, the thickness of the remaining base lead becomes 0.022". The shearing force at the surfaces of juncture between the active material and the base lead must then be ½ x 0.022 x 2,000, or 22 lbs. per linear inch where the cross section of the lead is ½ x 0.022, or 0.011 sq. inches. Should the stress for the given section exceed 22 lbs. per linear inch of strip, the allowable limit as arrived at above will be exceeded and the resulting shearing forces will be sufficient to cause a separation of the peroxide from the base lead. From these figures it will be seen that the ratio of the perimeter (disregarding the thickness of the base lead) to the cross-sectional area, expressed in inches and square inches, respectively, is $$\frac{½+½}{0.011} = 90.$$

If this ratio is less than 90, the shear per linear inch of strip between the peroxide coating and the base lead will exceed 22 lbs. and shearing of the peroxide will take place. The perimeter above mentioned will be seen to be a function of the surface area of contact or juncture between the active material and the base lead; this lateral surface or area of juncture will be seen to be directly proportional to the perimeter. Hence, undesirable peeling or shedding of the active material from the base lead may thus be avoided if the individual element of the storage battery plate is so proportioned that its resistance to elongation is not greater than the stress exerted upon the element by the active material being formed thereon. The base metal of the element may thus follow the expanding tendencies of the active material, and in so doing, relative movement between the coating of active material and the base lead itself is effectively prevented.

By way of example, and as conducive to a clearer understanding of certain features of this invention, the individual elements of the storage battery plate may be given the form of a cylinder of circular cross section, such as the members 14 shown in cross section in Figure 2 and in side elevation in Figure 1 of the drawing. These members 14, as hereinafter more specifically set forth, are formed preferably integrally out of sheets 11 of lead of relatively small thickness, for example, about $\frac{1}{20}$ of an inch. Preferably the members or elements 14 (see Figure 3) are of slightly less thickness or diameter than the thickness of the original sheet 11. When thus dimensioned or shaped, the forces exerted by the active material being formed thereon may bring about an elongation of the base metal of the element 14 itself, thus preventing shedding during formation. Moreover, the base metal of each element 14 may follow the expanding or contracting tendencies of the active material during subsequent charge or discharge of the battery, as the case may be.

The foregoing has been set forth more particularly, and as already hereinbefore noted, as conducive to a clearer understanding of certain features of this invention. From the foregoing it will be noted that each individual element 14 of one of the sheets 11 of the composite plate member hereinafter more clearly described, undergoes changes in length during the action of the battery. One of the features of this invention, as will clearly be seen hereinafter, resides in the provision of a practical and rugged means for mounting and supporting plate units or elements, more particularly of the character of those hereinbefore but briefly mentioned, and whereby the highly advantageous actions thereof may be effectively achieved. Another feature of this invention will be found to reside in the physical relation between adjacent elements or bars 14 as shown in Figure 3 of the drawing.

Considering first this latter feature, the elements 14 are spaced one from the other and transversely of the lead sheet out of which they are formed in such a manner that the ultimate exposed area of all of the members 14 of a single sheet will be substantially equivalent to the lateral exposed surface area of a single sheet prior to its being formed into the elements 14. In this manner there is achieved not only the prevention of shedding of the active material after the latter is formed on the individual elements 14, but also a very large available surface, lightness of construction, and ample cross section of base metal to insure adequate life for the battery plate.

In view of the above mentioned premises relating to this specific feature of this invention, the spacing, center to center, of the elements 14 is such that the exposed area of one element 14 is equivalent to the exposed lateral area of the unit section (substantially rectangular in shape) out of which an element 14 and its adjacent space is formed. The exposed area of an element 14 of unit length will be $\pi T \times 1$ (unit length), where T is the diameter or thickness of the element 14. If W is the width of the unit section out of which an element 14 and an adjacent space is formed, the exposed lateral area of this unit section (on two sides thereof, as will be clear) will be $W \times 1$ (unit length) $\times 2$, or $2W$. As above noted, these areas are equal to each other. Equating these values for the available lateral areas, we have $$2W = \pi T$$

hence $$(a) W = \frac{\pi T}{2}$$

From the foregoing, it will be seen that the value thus obtained for W gives the desired spacing between the elements 14 in making the plate elements 14 from a single sheet of lead.

Considering now a practical embodiment of this invention, reference may now be made to Fig. 1 of the drawing in which is shown an envelope or frame 10 to be more clearly hereinafter described adapted to receive and to support therein a plurality of sheets of lead, one of which, designated generally at 11, is shown in partial side elevation through the broken-away portion of the side wall of the envelope 10. The sheet 11 is preferably of relatively small thickness, for example about $\frac{1}{20}$ of an inch, and is formed or shaped by any suitable means into the form indicated in Fig. 1 of the drawings. Thus it will be noted that the sheet is cut longitudinally at preferably predetermined intervals so as to provide a border portion 12 extending around the entire sheet and so as to provide at suitable intervals in a longitudinal direction the reinforcing or supporting horizontally extending ribs or uncut portions 13. The portions of the sheet intervening the horizontal ribs 13 are cut into a plurality of longitudinally extending and relatively fine elements 14, which elements conform individually to the requirements and conditions above set forth. That is, the elements 14 are preferably of circular cross section.

As shown in Fig. 3 of the drawings, a plurality of sheets 11 formed as above described are placed adjacent one another so that their border portions 12 and their horizontally extending ribs 13 are in substantial registry. Referring more particularly to Fig. 3, in which the sheets 11 and their associated elements 14 are shown in unformed condition, it will be seen that alternate sheets, such as the sheets 11$^a$, for example, have the elements 14$^a$ thereof formed therein so that these elements are in staggered relation with the elements 14 of the intermediate plates 11. This staggered arrangement is not essential but is highly advantageous. Furthermore, it will be noted that in forming each of the sheets 11 or 11$^a$, the elements 14 therein are in the illustrative embodiment here shown made of a thickness or diameter slightly less than the thickness of the original sheet 11. The elements 14 or 14$^a$ may thus be treated as being formed of a sheet having a thickness equivalent to their diameter. Thus, when assembled as shown in Fig. 1 within the sleeve 10, the border portions 12 and the horizontal ribs 13 of each of the sheets 11 or 11$^a$ may be in registry and in contact with one another, and so that in case adjacent sheets are not properly aligned with respect to one another to bring about the staggered relation as shown in Fig. 1, sufficient space will be provided between the elements 14 or 14$^a$ of adjacent plates to permit the formation of active material thereon and to permit expansion of the active material to take place in a horizontal direction.

The sheets 11 above described may be formed in any suitable manner. Thus, for example, they may be stamped or pressed into the form described, but preferably they are cut into the form described in any suitable manner. Furthermore, it should be noted that the individual elements 14 of the individual sheets are spaced from one another preferably by such a distance equivalent to the relation (a) hereinbefore considered. This relation, it will be seen, is such that the width of space occupied by one element 14 and its adjacent intervening space is equivalent to $\frac{\pi T}{2}$ where T is the thickness of the element 14.

The envelope 10 may be constructed of an inert metal such as, for example, a lead-antimony alloy, or may be made of some suitable material such as hard rubber. The side walls of the envelope 10 are provided with a suitable number of perforations 15 to permit an adequate circulation of electrolyte to take place when the assembled plate is placed in operation, and its side walls are provided with a plurality of ribs 16 extending preferably at an angle with respect to the vertical dimension of the envelope 10 so as to provide adequate strength. Furthermore, the ribs 16 and their associated side walls with which they are preferably integrally formed may act as suitable separators between adjacent plate units or plates when assembled for operation in a cell.

The envelope 10 is preferably of a length somewhat in excess of the sheets 11 and surrounding its upper edge portions is provided with an integrally formed rim 17 undercut upon the interior thereof to provide the supporting ledge 18 extending throughout the entire upper ends of the four wall portions of the receptacle 10.

The sheets 11 when constructed as above noted, are assembled to the desired number intended to be placed in a single envelope 10 and, as will be seen from Fig. 2 of the drawings, the assembled sheets 11 thus far unformed chemically are adapted to fit substantially loosely within the envelope 10. By the construction above described by which, as will be noted, the individual elements 14 of the sheets are made of slightly less thickness than the border portions 12 and the horizontally extending ribs 13, the outer sheets when assembled and inserted in the envelope 10 will contact with the interior side walls of the envelope 10 only at the border portions 12 and the horizontal rib portions 13. The individual elements 14 of the outer two sheets will thus be maintained or held away from the walls of the envelope 10 and adequate space is thus provided therebetween for the formation of active material to take place. Moreover, the envelope 10 is preferably of somewhat greater width interiorly than are the assembled sheets 11, as viewed in Fig. 1, thus making provision for possible lateral expansions of the plate elements.

After the desired number of sheets 11 are assembled, a substantially rectangular lead collar 19 (see Figs. 2 and 3) is placed about the upper horizontal portion of the border 12 of the registering sheets and is burned to the horizontal portions of the border 12 of the several assembled sheets 11. The collar 19 is exteriorly shaped so as to be received within the upper open end of the envelope 10 and so as to rest upon the supporting ledges 18 formed therein as above described. A plurality of pins 20 preferably of hard rubber and extending through the rim portion 17 of the envelope 10 and through the upper horizontal portions of the registered borders 12 of the sheets 11 may thereupon be employed to rigidly hold the registered sheets 11 in assembled relation with respect to the envelope 10. Each sheet 11, moreover, is provided with an upstanding integrally formed lug 21 adapted also when the sheets 11 are assembled to register and thus to form a suitable means to which any suitable electrical connection may be made.

Considering now the action of the plate unit composed of a pluraltiy of sheets 11, it will be seen that each sheet is subdivided into a plurality of individual elements 14. Each element 14, when the plate unit undergoes the process of formation by which the active coating of peroxide is formed from the base lead is of such physical characteristics with respect to the active coating formed thereon that the maximum allowable shear between the coating and the element 14 itself is not exceeded. As above noted, each element 14 offers a materially less resistance to the tendency of the active coating to expand the base lead upon which it is formed and hence readily partakes of an expansion with the expansion of the coating itself. Such action would take place during the process of formation, which may be carried on in any suitable manner. Similarly, during discharge and charge of the battery, the expansion and contraction that takes place in the active material can readily bring about a corresponding expansion and contraction of each individual element 14 so that no shearing forces become effective to bring about a shedding of the active material.

Thus it will be seen that the entire plate unit is first subdivided into a plurality of relatively thin sheets each of which may thus more readily respond to the forces acting upon it, and that each individual sheet is in turn subdivided into a plurality of relatively small individual elements which may be suitably proportioned as already above noted to confine the shearing stresses within the desired limits. Thus, as each of the elements 14 tends to expand, for example, the expanding forces acting upon all the individual elements of a single sheet may readily bring about a corresponding expansion of the sheet 11, ample provision being made by providing sufficient space between the lower ends of the assembled sheets 11 and the bottom of the envelope 10 to permit such expansion to take place. Also, it will be noted that the construction provides one in which ample provision is made for conducting current either to or from each of the individual elements 14 and that by choosing a cross section of the elements 14 in the manner above described a most efficient use is made of the available base metal per unit weight thereof.

It will thus be seen that there has been provided in this invention a plate construction in which the material or active parts conform to the requirements specifically above set forth and that, aside from obtaining a construction in which a very great area in the aggregate of base metal available for formation into active material is obtained, adequate provision is made for maintaining the forces that tend to materially reduce the life of the battery plate within allowable and safe limits.

More specifically, it will be further noted that there has been provided in this invention a plate supporting structure whereby the forces acting upon the plate structure itself may be freely exerted to expand or contract the individual sheet members 11 of the plate or the sheet members as a whole, thus avoiding bending or warping of the plate members with consequent cracking or falling off of the active material. Thus, the active plate unit, suspended at its upper end from the encasing envelope 10, not only may partake of free elongation and contraction therein, but also is guided, as will be clear from Figs. 2 and 3, by the side walls of the encasing member 10 itself as relative movements therebetween take place. Moreover, it will also be noted that, in forming the member 10 so as to substantially completely encase the plate member or members therein, the latter are effectively safeguarded and protected against mechanical injury, this feature being of peculiar advantage in the practical handling of the plate members or units either during assembly of the battery or subsequently.

As many possible embodiments might be made of this invention and as many changes might be made in the embodiment set forth, it is to be understood that all matter herein before set forth or shown in the accompanying drawings is to be interpreted as illustrative and not in a limiting sense.

I claim as my invention:

1. In construction for storage batteries, in combination, a container adapted to receive an electrolyte, a plurality of active plates within said container adapted to form with said electrolyte the elements of a storage cell and each having a laterally extending projection adjacent its upper end, and insulating means of rigid material interposed between adjacent plates, the laterally extending projection of an active plate being engaged by said interposed insulating means for supporting said plate therefrom in depending relation.

2. In construction for storage batteries, in combination, a plate member comprising a plurality of substantially parallel spaced elements of substantially circular cross section formed integrally from said plate member and spaced center to center from one another by a distance not greater than $\frac{\pi}{2}$ times the diameter of said elements.

3. In construction for storage batteries, in combination, a container adapted to receive an electrolyte, a plurality of active plates within said container adapted to form with said electrolyte the elements of a storage cell and each having a laterally extending projection adjacent its upper end, insulating means of rigid material interposed between adjacent plates, the laterally extending projection of an active plate being engaged by said interposed insulating means for supporting said plate therefrom in depending relation, and means for mechanically interlocking a plate with an adjacent insulating means.

4. In construction for storage batteries, in combination, a plate member of sheet-like construction having a plurality of substantially parallel spaced elements formed integrally therefrom and having a thickness substantially equal to or less than the thickness of said plate member, each element having an exposed surface area substantially equivalent to the exposed lateral surface area of the unit section of said plate member out of which each element and its adjacent space is formed.

5. In construction for storage batteries, in combination, an active plate member of sheet-like construction having a plurality of longitudinally extending and substantially parallel spaced elements, insulating means having perforations therein to permit the circulation therethrough of an electrolyte substantially entirely encasing said plate member, and means for securing said plate member adjacent its upper end to said encasing means thereby to support said plate member in depending relation and to permit expansion of said plate member to take place.

6. In construction for storage batteries, in combination, an active plate member comprising a plurality of vertically extending and substantially parallel spaced elements, an envelope of insulating material for receiving said plate member and having perforations therein to permit access of an electrolyte, and means for supporting said plate member adjacent its upper end from said envelope thereby to support said plate member in depending relation, said envelope having an interior length greater than the length of said plate member whereby said elements and said plate member may freely expand and contract within said envelope.

7. In construction for storage batteries, in combination, a plate unit comprising a plurality of sheet-like sections each section comprising a plurality of substantially vertically extending spaced elements, insulating means having perforations therein to permit circulation therethrough of an electrolyte substantially entirely encasing said plate unit, and means for supporting said plate unit adjacent its upper end from said insulating means thereby to support said plate unit in depending relation and to permit expansion and contraction of the individual sheet-like sections to take place therein.

8. In construction for storage batteries, in combination, a plate unit comprising a plurality of sheet-like sections each section comprising a plurality of substantially vertically extending spaced elements, an envelope of an inert material for encasing said plate unit and having perforations therein to permit circulation therethrough of an electrolyte, a lead collar extending around the upper end portions of said sheet-like sections and in mechanical connection with each of said sections, and means for supporting said lead collar at the upper end of said envelope thereby to support said plate unit in depending relation and to permit expansion and contraction thereof to take place.

9. In construction for storage batteries, in combination, a plate unit comprising a plurality of sheet-like sections each section including a plurality of substantially vertically extending and spaced elements, a lead collar extending around the upper end portions of said sheet-like members and in mechanical connection with each section, and a perforated envelope of an inert material for receiving said plate unit and having a supporting ledge upon the interior upper portion thereof for supporting said lead collar, thereby to support said plate unit in depending relation.

10. In construction for storage batteries, in combination, an active plate member provided with a laterally extending projection adjacent its upper end and insulating means of rigid material substantially encasing said plate member, said laterally extending projection being engaged by said insulating encasing means for supporting said plate member therefrom in depending relation.

11. In construction for storage batteries, in combination, an active plate member having a collar extending around the upper end portion thereof and projecting laterally therefrom and an envelope of an inert material for substantially encasing said plate member and having perforations therein to permit circulation therethrough of an electrolyte and adapted at its upper end to engage said collar, thereby to support said plate member in depending relation therefrom.

12. In construction for storage batteries, in combination, a plate unit comprising a plurality of individual and active sheet-like sections, an envelope of an inert material for substantially encasing said plate unit and having perforations therein to permit circulation therethrough of an electrolyte, and means for mechanically interlocking said plate unit adjacent its upper end with said envelope.

13. In construction for storage batteries, in combination, a plate unit comprising a plurality of individual and active sheet-like sections, a lead collar extending around the upper end portions of said sheet-like section and in mechanical connection with each section, a perforated envelope of an inert material for receiving said plate unit and having a supporting ledge adjacent its upper end for receiving said lead collar, and means for interlocking said plate unit and said envelope to prevent disengagement of said lead collar from its associated supporting ledge.

14. In construction of the general nature of that herein described, in combination, a container adapted to receive an electrolyte, a plurality of active plate units within said container, each of said plate units comprising an envelope of rigid insulating material, an active plate mounted within said envelope and substantially encased thereby and being of less length than the length of said envelope, and means for supporting said plate at its upper end from said envelope.

15. In construction of the general nature of that herein described, in combination, a container adapted to receive an electrolyte, a plurality of plate units within said container, the active portions of which are adapted to form with said electrolyte the elements of a storage cell, each of said plate units comprising an envelope of rigid insulating material, a plurality of active plate members within each envelope, said plate members having a length less than the length of said envelope, and means for supporting said plurality of plates at their upper ends from said envelopes whereby said plates are supported in depending relation.

16. In construction of the general nature of that herein described, in combination, a container adapted to receive an electrolyte, a plurality of active plates within said container adapted to form with said electrolyte the elements of a storage cell, insulating means interposed between adjacent plates and supported within said container, and means for mechanically connecting said plates at their upper ends to said interposed insulating means thereby to support said plates in depending relation therefrom.

17. In construction of the general nature of that herein described, in combination, a container adapted to receive an electrolyte, a plurality of active plates within said container adapted to form with said electrolyte the elements of a storage cell, rigid insulating means of substantially the same expanse as said plates interposed between adjacent plates and supported by the bottom of said container, and means for mechanically connecting said plates at their upper ends to said insulating means thereby to support said plates in depending relation therefrom.

18. In construction for storage batteries, in combination, an active plate member comprising a plurality of spaced bars extending in the same general direction, each of which is dimensioned so that its resistance to elongation is not greater than the stress exerted upon the bar during formation by the active material formed thereon, an envelope of insulating material for receiving said plate member and having perforations therein to permit access of an electrolyte, and means for supporting said plate member adjacent its upper end from said envelope, thereby to support said plate member in depending relation, said envelope having an interior length greater than the length of said plate member whereby said bars and hence said plate member may freely expand and contract within said envelope.

19. In construction for storage batteries, in combination, a plate unit comprising a plurality of sheet-like sections, each section comprising a plurality of spaced bars extending in the same general direction, each of which bars is dimensioned so that its resistance to elongation is not greater than the strain exerted upon the bar during formation by the active material formed thereon, an envelope of inert material for encasing and receiving therein said sheet-like sections and having perforations therein to permit circulation therethrough of an electrolyte, and means for supporting said sheet-like sections in depending relation from and within said envelope.

In testimony whereof, I have signed my name to this specification this 8th day of March, 1922.

THEODORE S. COLE.